United States Patent [19]

Mizutani

[11] 4,409,461
[45] Oct. 11, 1983

[54] ELECTRICAL RESISTANCE WELDER FOR NAILS USED IN AN AUTOMATIC NAILING MACHINE

[75] Inventor: Hiroshi Mizutani, Gifu, Japan

[73] Assignee: Kabushiki Kaisha Chuo Seisakusho, Aichi, Japan

[21] Appl. No.: 304,918

[22] Filed: Sep. 23, 1981

[51] Int. Cl.³ .................................................. B23K 11/00
[52] U.S. Cl. ...................................... 219/111; 219/56; 219/113; 219/116
[58] Field of Search ................ 219/111, 112, 113, 108, 219/116, 56, 56.22, 61.5

[56] References Cited

U.S. PATENT DOCUMENTS

| | | |
|---|---|---|
| 2,784,405 | 3/1957 | Working . |
| 3,083,369 | 4/1963 | Peterson . |
| 3,398,255 | 8/1968 | Aldenhoff ........................ 219/108 |
| 3,436,514 | 4/1969 | Broomhall et al. ................ 219/113 |
| 3,442,374 | 5/1969 | Hillier . |
| 3,478,872 | 11/1969 | Becht . |
| 3,632,949 | 1/1972 | Thorne ............................ 219/108 |
| 3,892,941 | 7/1975 | Lehle ............................... 219/112 |

FOREIGN PATENT DOCUMENTS

| | | | |
|---|---|---|---|
| 612242 | 11/1948 | United Kingdom ............... | 219/113 |
| 585011 | 12/1977 | U.S.S.R. ........................... | 219/113 |

*Primary Examiner*—C. C. Shaw
*Attorney, Agent, or Firm*—Stevens, Davis, Miller & Mosher

[57] ABSTRACT

In an electrical resistance welder, whenever a material to be welded approaches the welding electrodes, a start signal is produced, so that welding current is supplied to the welding transformer in one direction for a certain period of time set by a time limit circuit, with the polarity changing in response to the start signal, whereby, even if materials are repeatedly fed for welding at high speed, they can be positively welded in a uniform manner.

2 Claims, 3 Drawing Figures

ELECTRICAL RESISTANCE WELDER FOR NAILS USED IN AN AUTOMATIC NAILING MACHINE

BACKGROUND OF THE INVENTION

This invention relates to electrical resistance welders, and more particularly to an electrical resistance welder which is suitable for welding relatively small materials.

In welding small materials such as thin metal wires, it is necessary to apply a relatively small current for a short time. In such a case, heretofore a capacitor type welder is employed. However, the welder is disadvantageous in that it takes a relatively long time to charge the capacitor of the welder, and it is impossible to increase the welding rate because of the service life of the capacitor.

In order to overcome this difficulty, a welding method has been proposed in which the half cycles of a commercial main frequency are utilized for welding. However, it is difficult to correctly supply current to the materials which are repeatedly fed for welding at high speed independently of the phase of the AC power source.

SUMMARY OF THE INVENTION

Accordingly, an object of this invention is to provide an electrical resistance welder which can suitably supply current to materials which are repeatedly fed for welding at high speed.

The foregoing object and other objects of the invention have been achieved by the provision of an electrical resistance welder which, according to the invention, comprises: a bridge type inverter made up of transistors; a welding transformer connected to the AC output side of the bridge type inverter; the first time limit circuit which is started by a start signal; a flip-flop whose state is changed whenever the start signal is supplied thereto; the second time limit circuit which is started by output of the first time limit circuit; and two gate circuits which receive the outputs of the flip-flop and the second time limit circuit, so that the welding current is supplied to the welding transformer for a predetermined time interval provided by the time limit circuits with its polarity changing alternately whenever the start signal is provided.

The nature, principle and utility of the invention will become more apparent from the following detailed description when read in conjunction with the accompanying drawings.

DETAILED DESCRIPTION OF THE INVENTION

Figure 3:
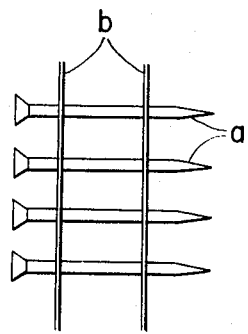
FIG. 3 is a plan view of an article which is manufactured by the welder of the invention.

One preferred embodiment of this invention shown in the accompanying drawings is an electrical resistance welder which is used for nails for an automatic nailing machine. The nails are spot-welded to two thin parallel metal lines at predetermined intervals as shown in FIG. 3.

Figure 1:
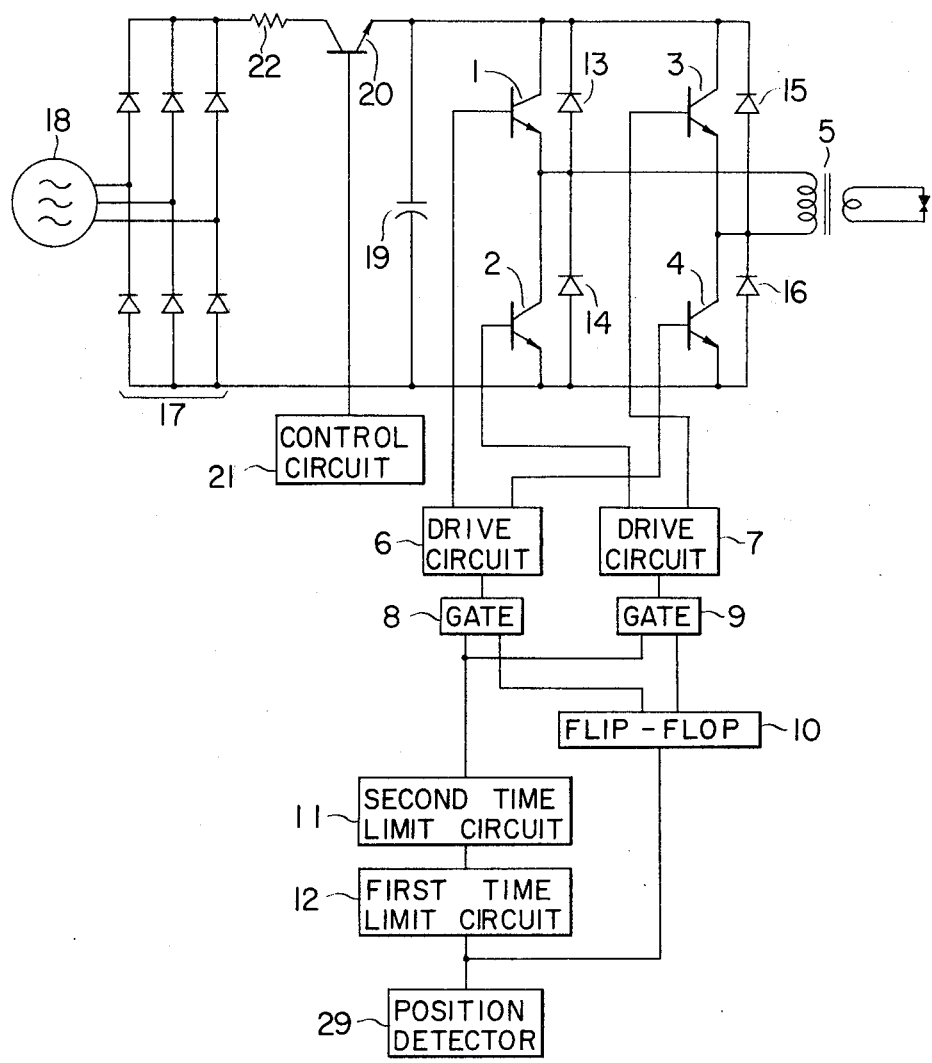
FIG. 1 is a circuit diagram, partly as a block diagram, showing one example of an electrical resistance welder according to this invention.

In FIG. 1, reference numerals 1 and 2 designate one set of series-connected transistors; 3 and 4, another set of series-connected transistors, these sets of transistors being connected to a power source; 5, a welding transformer whose primary winding is connected to the connecting point of the transistors 1 and 2 and to the connecting point of the transistors 3 and 4, the secondary winding of the welding transformer 5 being connected to a welding electrodes; 6, a drive circuit for driving the transistors 1 and 4; 7, a drive circuit for driving the transistors 2 and 3; 8 and 9, gates whose outputs are supplied to the drive circuits 6 and 7, respectively; and 10, a flip-flop which supplies an enabling signal to the gate 8 when reset and applies an enabling signal to the gate 9 when set. A position detector 29 supplies a start signal to the flip-flop 10. The state of the flip-flop 10 is changed whenever the start signal is supplied to the flip-flop 10.

Further in FIG. 1, reference numerals 11 and 12 designate time limit circuits. The second time limit circuit 11 is started by the output of the first time limit circuit 12. The first time limit circuit 12 outputs a signal each time the start signal is applied by the position detector 29. The output of the second time limit circuit 11 is supplied to the gates 8 and 9, so that it is supplied to one of the drive circuits 6 and 7 depending on the state of the flip-flop 10.

Referring to FIG. 1, reference numerals 13 through 16 designate diodes which are parallel-connected opposite in polarity to the transistors 1 through 4; 17, a rectifier circuit adapted to rectify the alternate current of an AC power source 18 thereby to feed a direct current to a bridge type inverter consisting of the aforementioned transistors 1 through 4; 19, a capacitor; 20, a transistor provided between the rectifier circuit 17 and the transistor inverter, to operate to maintain the voltage of the capacitor 19 constant with the aid of a control circuit 21; and 22, a current limit resistor.

Figure 2:
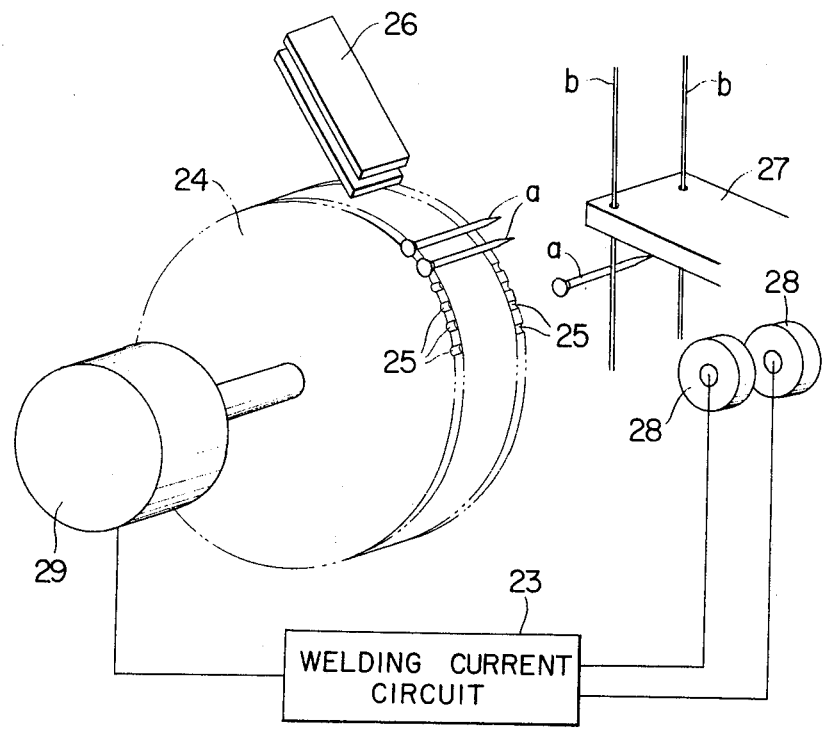
FIG. 2 is an explanatory diagram showing the essential components of the electrical resistance welder according to the invention.

In FIG. 2, reference numeral 23 simply designates a welding current circuit which is a whole of the circuitry shown in FIG. 1; and 24, a disk having grooves cut in the periphery, the grooves being used to hold nails. The disk 24 is turned by an electric motor (not shown), and nails a are supplied into the grooves 25 from a chute 26.

Further in FIG. 2, reference numeral 27 designates a wire feeding guide provided close to the disk 24, to feed wires b along the array of nails in the grooves 25; 28 and 28, roller electrodes; and 29, the aforementioned position detector which is mounted on the shaft of the disk 24. The roller electrodes 28 operate to push the wires b against the nails a in the grooves 25 of the disk 24 with the aid of a pressurizing mechanism (not shown). The roller electrodes 28 are electrically insulated from each other and are connected to the secondary winding of the welding transformer 5. The position detector 29 produces a signal immediately before each groove 25 reaches the roller electrodes 28 by the rotation of the disk 24. This signal is supplied to the time limit circuit 12 and the flip-flop 10 as the aforementioned start signal.

In operation, the disk 24 is rotated, while receiving the nails a. Therefore, the nails a together with the wires b approach the electrodes 28. Whenever each nail a comes near the electrodes 28, the position detector 29 provides the signal, as described before. The nail a reaches the roller electrodes 28 during the time limit period of the time limit circuit 12. Thereupon, the time limit circuit 11 is started. When the flip-flop 10 is in the reset state, the output of the time limit circuit 11 is applied through the gate 8 to the drive circuit 6, as a result of which the transistors 1 and 4 are maintained conductive (ON) for the time interval determined by the time limit circuit 11. Accordingly, a pulse current is supplied through the transistors 1 and 4 to the primary winding of the welding transformer 5. Owing to the primary current, the secondary current flows from one of the roller electrodes 28 through the wire b, the nail a and the other wire b to the other roller electrode 28, as a result of which the nail a is welded to the wires b.

As the disk 24 is further rotated, the next nail a approaches the roller electrodes 28, whereupon the position detector produces the signal again and therefore the flip-flop 10 is set. The time limit circuits 11 and 12 operate similarly as in the above-described case. The output of the time limit circuit 11 is supplied through the gate 9 to the drive circuit 7, so that the transistors 2 and 3 are rendered conductive. Therefore, the same pulse current is supplied in the opposite direction to the primary winding of the welding transformer 5 through the transistors 2 and 3. Owing to the primary current, the secondary current flows in the opposite direction, as a result of which the nail is welded to the wires.

As is apparent from the above description, according to the invention, the current is supplied to the primary winding of the welding transformer alternately in the opposite directions by one time limit circuit for the predetermined period of time. Accordingly, the transformer is never given the direct current component of excitation. The energization time can be changed readily. Furthermore, the current value can be readily controlled by changing the turn ratio of the transformer, or the supply voltage. The energization can be started at any time. Therefore, no matter when materials to be welded are supplied, welding can be carried out under predetermined conditions.

In the above-described embodiment, the diodes 13 through 16 are parallel-connected opposite in polarity to the transistors 1 through 4. This is for feedback to the power source in the case where the reactance of the secondary circuit of the welding transformer 5 is large. The transistor 20 and the control circuit 21 are provided to maintain the welding current constant even when the supply voltage varies. The secondary circuit shown in this embodiment is such that two welding points are in series between the roller electrodes 28; however, the current may be supplied between the disk 24 and the roller electrodes 28. The fine adjust of the relative position of the disk 24 and the position detector 29 can be replaced by controlling the limit time of the time limit circuit 12.

The transistors 1 through 4 may be connected in series or in parallel depending on the capacities thereof, and a snubber circuit comprising resistors and capacitors may be added.

What is claimed is:

1. An electrical resistance welder for welding nails used in an automatic nailing machine comprising:
   a rotary disk having grooves cut in a periphery thereof at predetermined intervals for holding said nails;
   means for successively feeding nails into said grooves;
   means for rotating said disk to successively place said nails in a predetermined welding position;
   means for feeding a pair of wires at a constant speed to said position where said wires can be contacted with one of said nails held in said grooves;
   a position detector for producing a signal upon each rotation of said disk by a predetermined rotating angle corresponding to said intervals; and
   energization means having current supplying elements contacting said wires, for supplying momentary currents through a circuit consisting of said wires and a nail contacted therewith at said welding position each time said signal is produced; said rotary disk, energization means and feeding means cooperating to weld nails across said pair of wires successively so as to make nails suitable for use in an automatic nailing machine.

2. An electrical resistance welder as claimed in claim 1 wherein said energization means comprises:
   a bridge type inverter made up of transistors;
   a welding transformer connected to the AC output side of said bridge type inverter;
   a first time limit circuit which is started by a signal from said position detector;
   a flip-flop whose state is changed whenever said signal is supplied thereto;
   a second time limit circuit which is started by the output of said first time limit circuit; and
   two gate circuits which receive outputs from said flip-flop and said second time limit circuit; and,
   first and second drive means respectively connected to the outputs of said gate circuits, each of said drive means respectively driving transistor pairs of said bridge circuit, so that current is applied to said welding transformer for a predetermined limit time provided by said second time limit circuit with the polarity thereof changing alternately whenever said start signal is produced.

* * * * *